US008873835B2

(12) United States Patent
Asente et al.

(10) Patent No.: US 8,873,835 B2
(45) Date of Patent: Oct. 28, 2014

(54) METHODS AND APPARATUS FOR CORRECTING DISPARITY MAPS USING STATISTICAL ANALYSIS ON LOCAL NEIGHBORHOODS

(71) Applicant: Adobe Systems Incorporated, San Jose, CA (US)

(72) Inventors: Paul Asente, Redwood City, CA (US); Scott D. Cohen, Sunnyvale, CA (US); Brian L. Price, San Jose, CA (US); Lesley Ann Northam, Picton (CA)

(73) Assignee: Adobe Systems Incorporated, San Jose, CA (US)

( * ) Notice: Subject to any disclaimer, the term of this patent is extended or adjusted under 35 U.S.C. 154(b) by 162 days.

(21) Appl. No.: 13/675,905

(22) Filed: Nov. 13, 2012

(65) Prior Publication Data

US 2013/0136338 A1 May 30, 2013

Related U.S. Application Data

(60) Provisional application No. 61/565,370, filed on Nov. 30, 2011.

(51) Int. Cl.
| | |
|---|---|
| *G06K 9/00* | (2006.01) |
| *G06K 9/34* | (2006.01) |
| *G06K 9/62* | (2006.01) |
| *G06K 9/46* | (2006.01) |
| *G06T 7/00* | (2006.01) |

(52) U.S. Cl.
CPC ......... *G06K 9/46* (2013.01); *G06T 2207/10012* (2013.01); *G06K 9/342* (2013.01); *G06K 9/00208* (2013.01); *G06K 9/6284* (2013.01); *G06T 7/0097* (2013.01); *G06T 7/0081* (2013.01)

USPC ........... 382/154; 382/209; 382/375; 382/278; 358/3.26; 358/537

(58) Field of Classification Search
USPC ................. 382/154, 209, 219, 228, 275, 278; 358/3.26, 3.27, 537, 453
See application file for complete search history.

(56) References Cited

U.S. PATENT DOCUMENTS

| 7,076,101 | B2 * | 7/2006 | Chung et al. | 382/218 |
| 7,715,623 | B2 * | 5/2010 | Ling et al. | 382/168 |

(Continued)

FOREIGN PATENT DOCUMENTS

EP 2511875 10/2012

OTHER PUBLICATIONS

Bleyer, M.; Rother, C.; Kohli, P., "Surface stereo with soft segmentation," Computer Vision and Pattern Recognition (CVPR), 2010 IEEE Conference on , vol., No., pp. 1570-1577, Jun. 13-18, 2010.

(Continued)

*Primary Examiner* — Yosef Kassa
(74) *Attorney, Agent, or Firm* — Wolfe-SBMC

(57) ABSTRACT

Methods and apparatus for disparity map correction through statistical analysis on local neighborhoods. A disparity map correction technique may be used to correct mistakes in a disparity or depth map. The disparity map correction technique may detect and mark invalid pixel pairs in a disparity map, segment the image, and perform a statistical analysis of the disparities in each segment to identify outliers. The invalid and outlier pixels may then be corrected using other disparity values in the local neighborhood. Multiple iterations of the disparity map correction technique may be performed to further improve the output disparity map.

20 Claims, 17 Drawing Sheets

(56) References Cited

U.S. PATENT DOCUMENTS

| | | | |
|---|---|---|---|
| 7,940,999 B2 * | 5/2011 | Liao et al. | 382/294 |
| 8,705,826 B2 * | 4/2014 | Liu et al. | 382/131 |
| 8,731,286 B2 * | 5/2014 | Cavet | 382/165 |

OTHER PUBLICATIONS

C. C. Dorea, and R. L. de Queiroz, "Depth map discontinuity correction for 3D video systems," Proc. of Intl. Telecom. Symp., Manaus, Brazil, Sep. 2010. pp. 1-4.

Grum, M.; Bors, A.G., "Multiple image disparity correction for 3-D scene representation," ICIP 2008. pp. 209-212, Oct. 12-15, 2008.

H. Hirschmuller. Stereo processing by semiglobal matching and mutual information. IEEE Trans. Pattern Analysis and Machine Intelligence, 30(2)328-341, 2008.

R. Mohan, G. Medioni, R. Nevatia, "Stereo Error Detection, Correction, and Evaluation," IEEE Transactions on Pattern Analysis and Machine Intelligence, pp. 113-120, Feb. 1989.

S. Mattoccia. A locally global approach to stereo correspondence. In Proc. IEEE Int. Workshop on 3D Digital Imaging and Modelling, pp. 1763-1770, 2009.

* cited by examiner

METHODS AND APPARATUS FOR CORRECTING DISPARITY MAPS USING STATISTICAL ANALYSIS ON LOCAL NEIGHBORHOODS

PRIORITY INFORMATION

This application claims benefit of priority of U.S. Provisional Application Ser. No. 61/565,370 entitled "Methods and Apparatus for Correcting Disparity Maps using Statistical Analysis on Local Neighborhoods" filed Nov. 30, 2011, the content of which is incorporated by reference herein in its entirety.

DISCLOSURE OF GOVERNMENT SUPPORT AND LICENSE RIGHTS

This invention was made with government support under Prime Award #: 1019343 Subaward #: CIF-C-149, CFDA: 47.070 awarded by The National Science Foundation. The government has certain rights in the invention. This material is based upon work supported by the National Science Foundation under Grant #1019343 to the Computing Research Association for the CIFellows Project.

BACKGROUND

Description of the Related Art

For a stereo pair of images, disparity maps are derived images that describe the distance between the left and right images for some feature. There is one depth map for the left image, and one depth map for the right image. For example, assume that the tip of a person's nose is three pixels further to the right in the right image than it is in the left image. The disparity value in the left disparity map for that pixel would be 3, and the disparity value in the right disparity map for that pixel would be –3. For any pixel in one if the stereo images, the disparity map may be examined to find the corresponding pixel in the other image. Disparity maps may also be referred to as depth maps because depth varies inversely with disparity: there is some distance from the viewer at which disparity is zero. For things closer than that distance, disparities will become increasingly positive (or negative, depending upon the convention) and for things farther than that distance, disparities will become increasingly negative (or positive). From the disparity, the depth can be calculated; conversely, if the depth is known, the disparity can be calculated.

Disparity maps obtained from stereo matching algorithms or depth maps from hardware designed to compute depths generally contain many errors. These errors may hurt the performance of any algorithm that uses them. One conventional solution is to use a low-pass filter to remove or blur out mistakes. However, this only works for noise in the disparity maps and not for large, structured mistakes. This conventional technique may also blur or change the edges in the disparity map, which are very important for many applications, and may remove high-frequency features that exist in the scene. Another conventional solution is to segment the disparity map into homogeneous regions and remove any region whose size is below a threshold. However, this technique only removes small homogeneous mistakes. An additional conventional solution is to fit planes to segmented regions of the image if they are homogenous in color. However, this approach only fixes mistakes in homogeneously-colored regions and restricts their disparities to a plane.

SUMMARY

Various embodiments of methods and apparatus for disparity map correction through statistical analysis on local neighborhoods are described. Embodiments of a disparity map correction technique are described that may be used to correct mistakes in a disparity or depth map. Embodiments of the disparity map correction technique may detect possible mistakes by performing a statistical analysis of the disparities in a given local neighborhood and identifying outliers. These incorrect disparities are then corrected using other disparity values in the local neighborhood. Multiple iterations of the disparity map correction technique can be performed to improve performance.

In at least some embodiments of the disparity map correction technique, any obvious or possible errors in the disparity map are detected and marked as invalid. The image is divided into local neighborhoods or segments, for example according to color, where the distribution of disparities is predicted to be somewhat similar. A statistical analysis is performed on each segment to identify and mark statistical outliers in the segments that should also be corrected. In each segment, the disparity values at pixels that were identified as invalid or as outliers are replaced using disparity information from other pixels in the respective segment. The process may be repeated using smaller segmentations at each new iteration to improve results.

Figure 1:
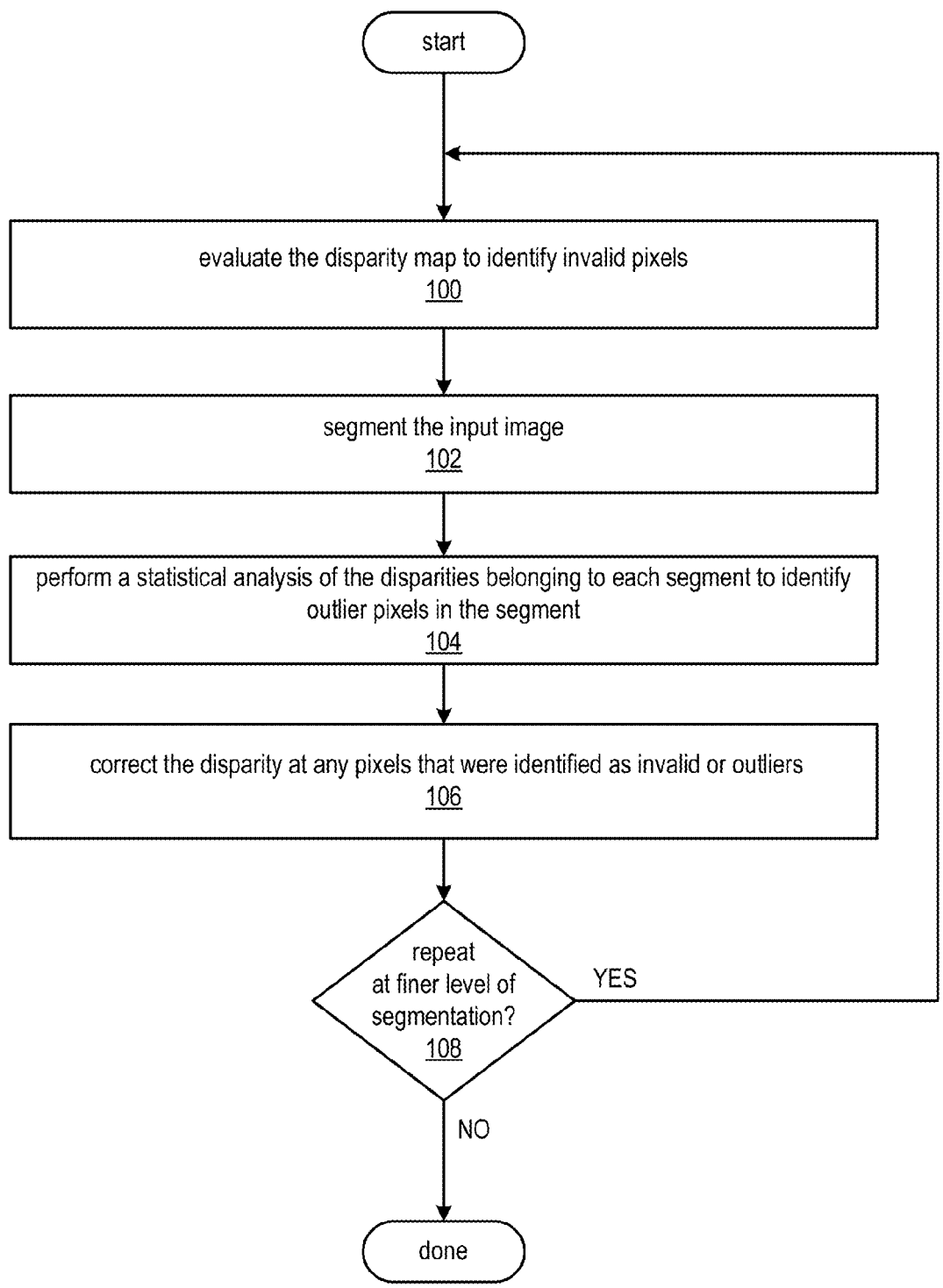
FIG. 1 is a flowchart of a disparity map correction technique, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for disparity map correction through statistical analysis on local neighborhoods are described. Embodiments of a disparity map correction technique are described that may be used to detect and correct errors in a disparity or depth map. A disparity map contains a disparity (an offset to the corresponding point or pixel in another image, which is also the inverted depth) for every pixel in a corresponding image, and can be created, for example, by an algorithm that computes corresponding disparities for pixel pairs in two (or more) images. A depth map can be created by inverting a disparity map or from hardware such as a time-of-flight camera, laser range finder, structured-light system, etc. However, disparity maps often contain errors that can hurt the performance of algorithms that may use them. Embodiments of the disparity map correction technique described herein may detect invalid disparities in the entire disparity map, segment the image into local neighborhoods, and perform a statistical analysis of each segment to identify outlier disparities in the segments. The identified incorrect disparities (both the invalid and the outlier disparities) may then be corrected using other disparity values in the local neighborhood. The technique may be repeated to improve the output disparity map.

Embodiments of the disparity map correction technique may automatically detect and eliminate obvious errors (e.g., bright white lines left over from a scanline disparity algorithm, large white boxes, etc) as well as local statistical outliers in the segments. In embodiments of the disparity map correction technique, the process of identifying errors (invalid and outlier disparities) may be robust and may find not only small noisy errors but also larger structured errors. In addition, a method for replacing the detected errors may be used that is more flexible than conventional approaches that require the disparities to conform to a plane. Embodiments of the disparity map correction technique may also enhance surface boundaries in the disparity map, so that the output disparity map more closely resembles the input image.

In at least some embodiments of the disparity map correction technique, any obviously wrong disparities in the disparity map are detected and marked as invalid. Obviously wrong disparities may include, but are not limited to, disparities from a stereo pair that match pixels with significantly different colors (i.e., the color difference is above a threshold) and disparities that indicate that the pixel in one image is occluded by an object that is behind it. Note that the disparity map correction technique may be applied to grayscale images as well as color images; in this case, pixel pairs that indicate significantly different grayscale levels may be determined as invalid. In addition, pixels for which the matching pixel location is not in the other map may be detected and marked as invalid.

In at least some embodiments of the disparity map correction technique, local neighborhoods or segments where disparities should be similar are determined. In at least some embodiments, determining local neighborhoods where disparities should be similar can be done by computing a segmentation of the image according to color, where each segment includes pixels of substantially similar color. Note that the disparity map correction technique may be applied to grayscale images as well as color images. Statistics are computed over each segment (any pixels previously detected as invalid may be excluded from the statistical computation). Any disparities in a segment that are determined to deviate from the computed local distribution of disparities by more than a threshold are marked as outliers. The invalid disparities and the outlier disparities may then be replaced with disparity values from valid neighbor disparities in the segment, which results in a low-frequency variation of the disparities in the segment.

The above process may be, but is not necessarily, repeated with increasingly smaller local neighborhoods, for example smaller segments generated by re-segmenting the image at finer levels, to improve results.

While embodiments of the disparity map correction technique are generally described herein as being applied to correct disparity maps generated for pairs of stereo images, the technique may be more generally applied to any type of depth map or similarity map for an image or images to detect and correct errors.

FIG. 1 is a flowchart of a disparity map correction technique, according to at least some embodiments. As indicated at 100, the technique may evaluate the disparity map for an input image to identify invalid disparities at pixels in the image. Invalid disparities may include disparities that are determined to be clearly wrong and disparities that are determined to be possibly wrong. As indicated at 102, the input image may be segmented into a plurality of segments. Note that, in some embodiments, element 102 may be performed before element 100; however, the evaluation at element 100 may not depend on the segmentation of 102. As indicated at 104, a statistical analysis may be performed on the disparities in each segment to identify pixels that are outliers in the respective segment. As indicated at 106, the disparity values at any pixels that were identified invalid and at any pixels that were identified as outliers in the segments may be corrected. At 108, elements 100 through 106 may be repeated as necessary or desired at a finer level of segmentation to improve results. The elements of FIG. 1 are discussed in more detail below.

FIGS. 4 through 8 graphically illustrate applying an embodiment of the disparity map correction technique to a disparity map for an example image.

Figure 4:
FIG. 4 shows an example original photograph or image.
Figure 5:
FIG. 5 shows an original disparity map for the image of FIG. 4 before applying the disparity map correction technique.
Figure 6:
FIG. 6 shows segmentation boundaries for the original disparity map shown in FIG. 5, according to at least some embodiments.

FIG. 4 shows an example original photograph or image. Note that the image may be one of two or more images for which a disparity map is generated for the image, for example one of a stereo image pair (either a left or right image). FIG. 5 shows an original disparity map for the image of FIG. 4 before applying the disparity map correction technique. Note that the boundaries of the rose are stretched into surrounding regions, making it difficult to identify particular objects in the scene. FIG. 5 shows segmentation boundaries for the original disparity map shown in FIG. 5, according to at least some embodiments. The circled region shows outliers in a petal portion of the flower.

Figure 7:
FIG. 7 shows the segmentation boundaries for a corrected disparity map after two iterations of the disparity map correction technique, according to at least some embodiments.

FIG. 7 shows the segmentation boundaries for a corrected disparity map after two iterations of the disparity map correction technique, according to at least some embodiments. Note that the outliers in the petal portion indicated by the circle are repaired by the disparity map correction technique when compared to the original disparity map shown in FIGS. 5 and 6.

Figure 8:
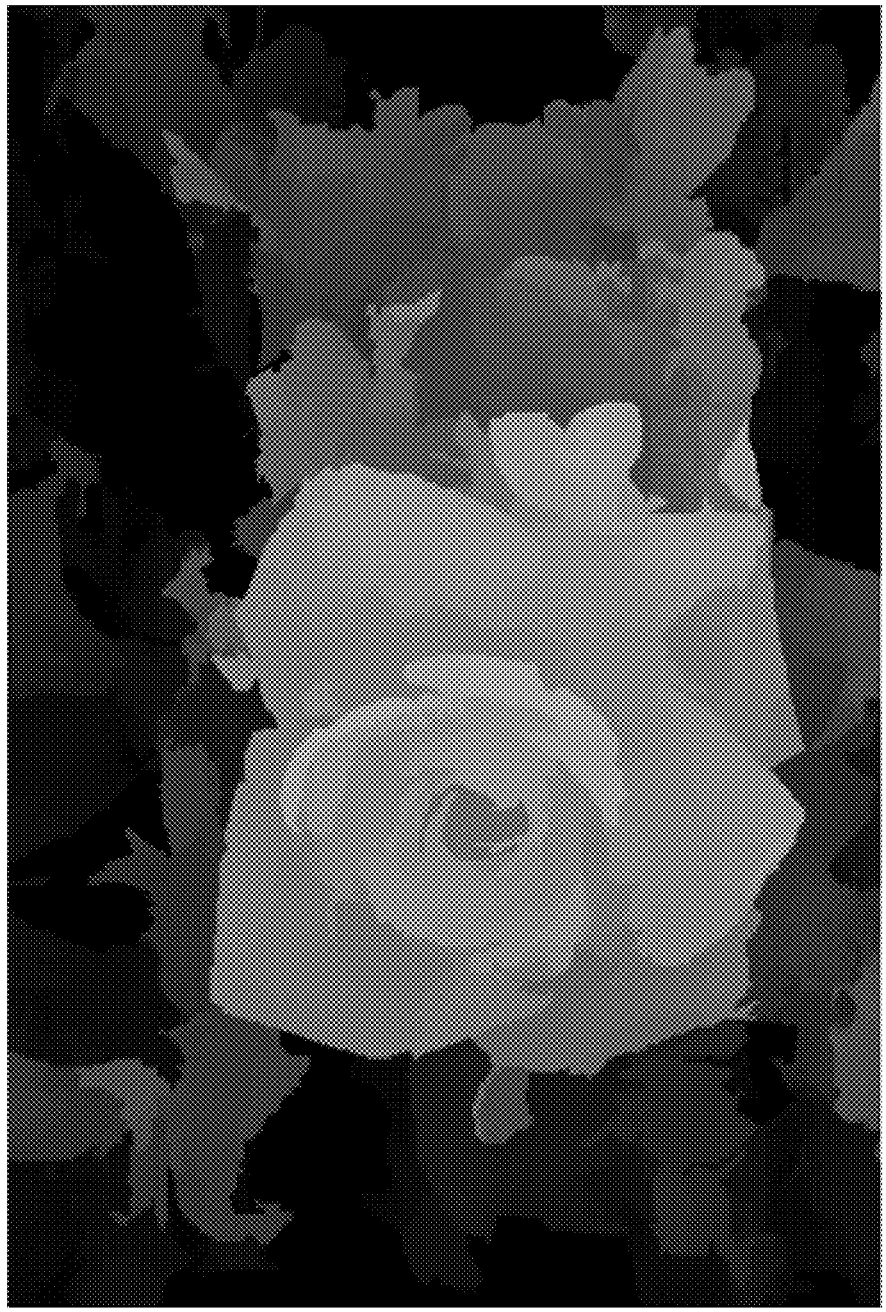
FIG. 8 shows the corrected disparity map for the image of FIG. 4 after applying the disparity map correction technique, according to at least some embodiments.

FIG. 8 shows the corrected disparity map for the image of FIG. 4 after applying the disparity map correction technique, according to at least some embodiments. Note how the boundaries of the rose are crisp and clearly identifiable. This is achieved by the disparity map correction technique handling each segment separately. By handling each segment separately, neighboring segments do not influence each other, and the segment edges are preserved.

Disparity Map Correction Technique Details

Figure 2:
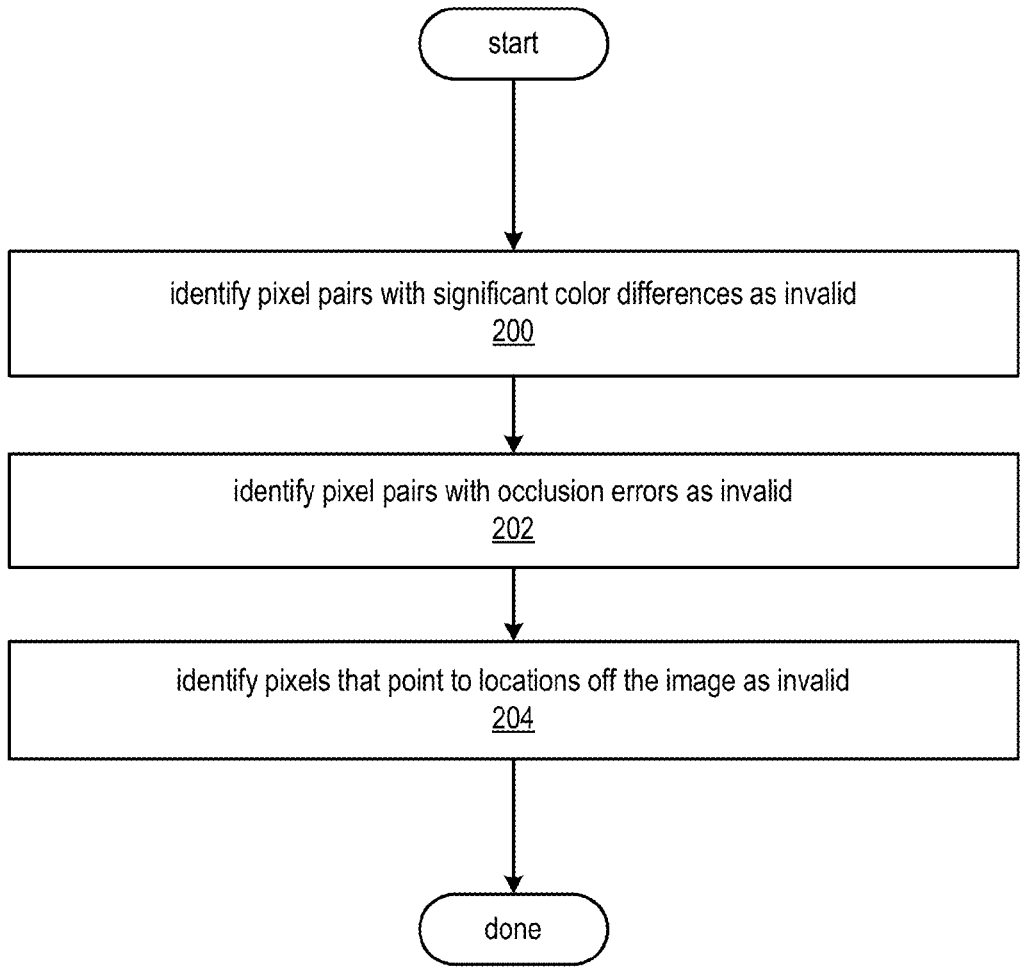
FIG. 2 is a flowchart of an example method for identifying invalid pixels in a disparity map, according to at least some embodiments.
Figure 9:
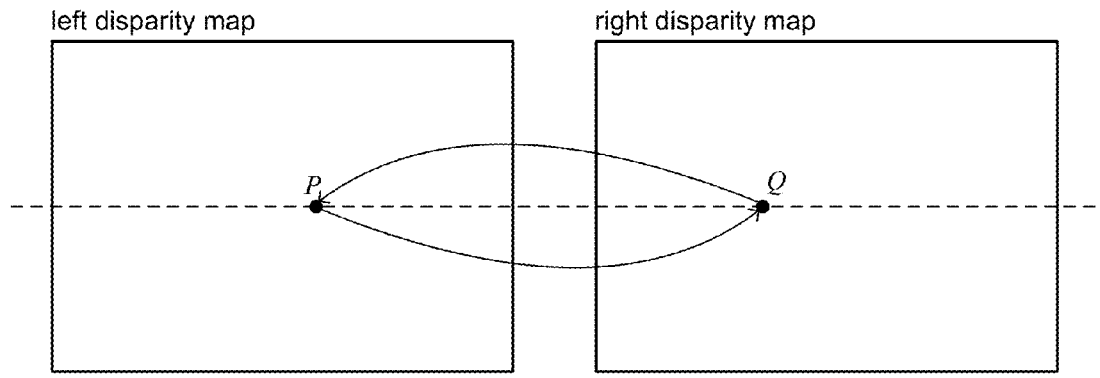
FIG. 9 illustrates correspondence between pixels in the left and right images of a stereo image pair.
Figure 10A:
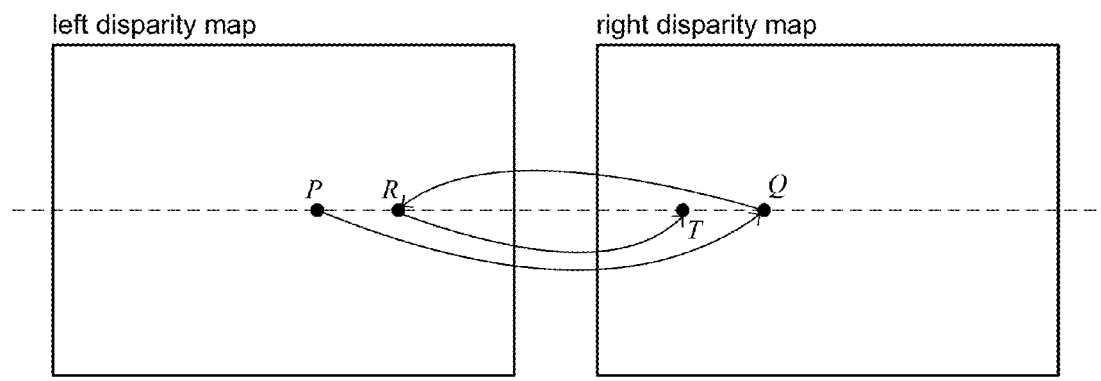
FIG. 10A illustrates correspondence between pixels in the left and right images of a stereo image pair when a pixel is occluded, according to some embodiments.
Figure 10B:
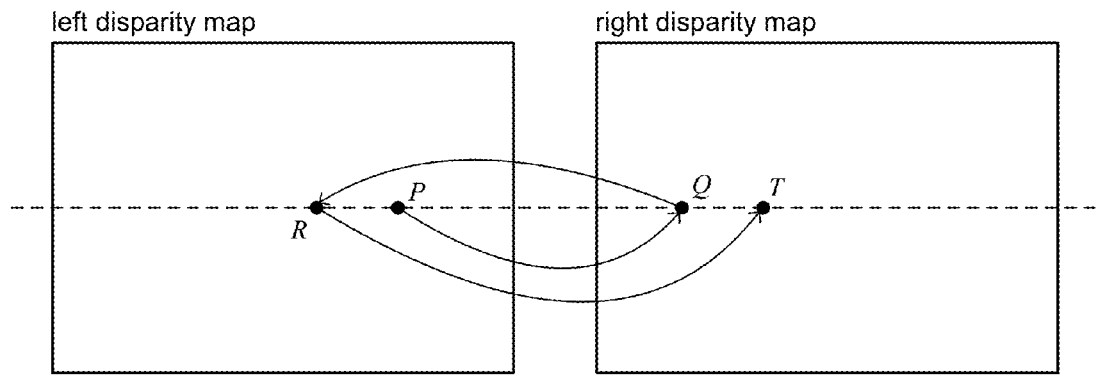
FIG. 10B illustrates correspondence between pixels in the left and right images of a stereo image pair that indicates an occlusion error, according to some embodiments.

This section describes the elements of the disparity map correction technique as illustrated in FIG. 1 in more detail. As indicated at 100 of FIG. 1, the technique may evaluate an input disparity map for an image to identify invalid disparities. FIG. 2 is a flowchart of an example method for identifying invalid disparities that may be used at element 100, according to at least some embodiments. FIGS. 9, 10A, and 10B each show a left and right disparity map for a pair of images.

As indicated at 200 of FIG. 2, pixel pairs with significant color differences (or grayscale differences for grayscale images) may be identified as invalid. FIG. 9 illustrates correspondence between pixels in the left and right images of a stereo image pair. Referring to FIG. 9, let P be a pixel in the left image, and let Q be a pixel in the right image such that P→Q (P corresponds to Q). In the typical (consistent) case, Q→P. In at least some embodiments, the technique may identify a pixel pair as being clearly wrong and thus invalid if the pixel pair is consistent (P→Q and Q→P), but the difference in color between the pixels varies greatly, e.g. is above a specified threshold. For example, if:

$$\|C_l(P) - C_r(Q)\| > \theta,$$

then it is unlikely for P and Q to be correct ($C_l$ is the left image, $C_r$ is the right image, and $\theta$ is the maximum allowable difference between two colors). (Again, note that the disparity map correction technique may also be applied to grayscale images.)

As indicated at 202 of FIG. 2, pixel pairs with occlusion errors may be identified as invalid. In at least some embodiments, the technique may identify a pixel pair as being clearly wrong and thus invalid if there are disparities that indicate that an object is occluded by something behind it. Referring to FIG. 10A, let P be a pixel in the left image, and let Q be a pixel in the right image such that P→Q (P corresponds to Q). In addition, let R be a pixel in the left image, and let T be a pixel in the right image such that P→Q→R→T. In this case, the pixel is indicated as being occluded by something in front of the pixel, which is a normal case. FIG. 10B illustrates correspondence between pixels in the left and right images of a stereo image pair that indicates an occlusion error, e.g. when a pixel appears to be occluded by something that is behind it. This occurs when P→Q→R→T, but P>R (P is to the right of R), as shown in FIG. 10B. This assumes that a pixel in the right image is to the left of its matching pixel in the left image, which is required by many stereo matching algorithms that compute disparities. If other assumptions are made, an occlusion error may be otherwise indicated.

As indicated at 204 of FIG. 2, pixels that point to locations off the image (as in the case of some pixels near an edge of a disparity map) may be identified as invalid. In at least some embodiments, the technique may determine that P→Q and that Q is not in the image (Q<0 or Q>=the width of the image). However, this does not necessarily indicate that the pixel is clearly wrong, but does indicate that no information is available for it. Thus, in at least some embodiments, these pixels may be marked as invalid.

Referring again to FIG. 1, as indicated at 102, the input image may be segmented into a plurality of segments, each segment corresponding to a region of relatively similar color (or grayscale levels for grayscale images), e.g. color within a specified and relatively small range. In at least some embodiments, the segmentation may be based on the intuition that regions of the image where color does not change much will usually correspond to areas where depth does not change much and, where it changes, changes smoothly. In at least some embodiments, a mean shift algorithm, for example as described in the EDISON library, may be used in the segmentation technique. However, any segmentation algorithm that can form regions (segments) of similar color may be used in embodiments. In at least some embodiments, the segmentation technique may be configured to generate reasonably large segments (e.g., above some size threshold) to ensure that the statistical analysis can separate good pixels from bad pixels.

In some images, certain areas of the image may include fine-grained texture, and a segmentation of such an area may result in many small regions. In some embodiments, if this occurs, small regions (e.g., two or more regions less than a minimum region size) may be merged to generate regions that are greater than the minimum region size. Note that two or more iterations of disparity map correction technique may be performed using a threshold for segmenting that tends to generate smaller regions, and the minimum region size may be decreased at each iteration. In other embodiments, the small regions may not be merged, or may be merged at one or more initial iterations, but not merged at subsequent iterations.

Figure 11:
FIG. 11 shows the input image of FIG. 4 segmented into segments of similar color, according to at least some embodiments.

FIG. 11 shows the input image of FIG. 4 segmented into regions of similar color, according to at least some embodiments. The regions or segments shown in FIG. 11 correspond to regions of similar color from FIG. 4. In at least some embodiments, the variance of disparity within a region may be small because the variance in color within the region is small. A large variance in disparity may reflect a large change in depth and therefore a large variance in the shading of the surface.

Figure 3:
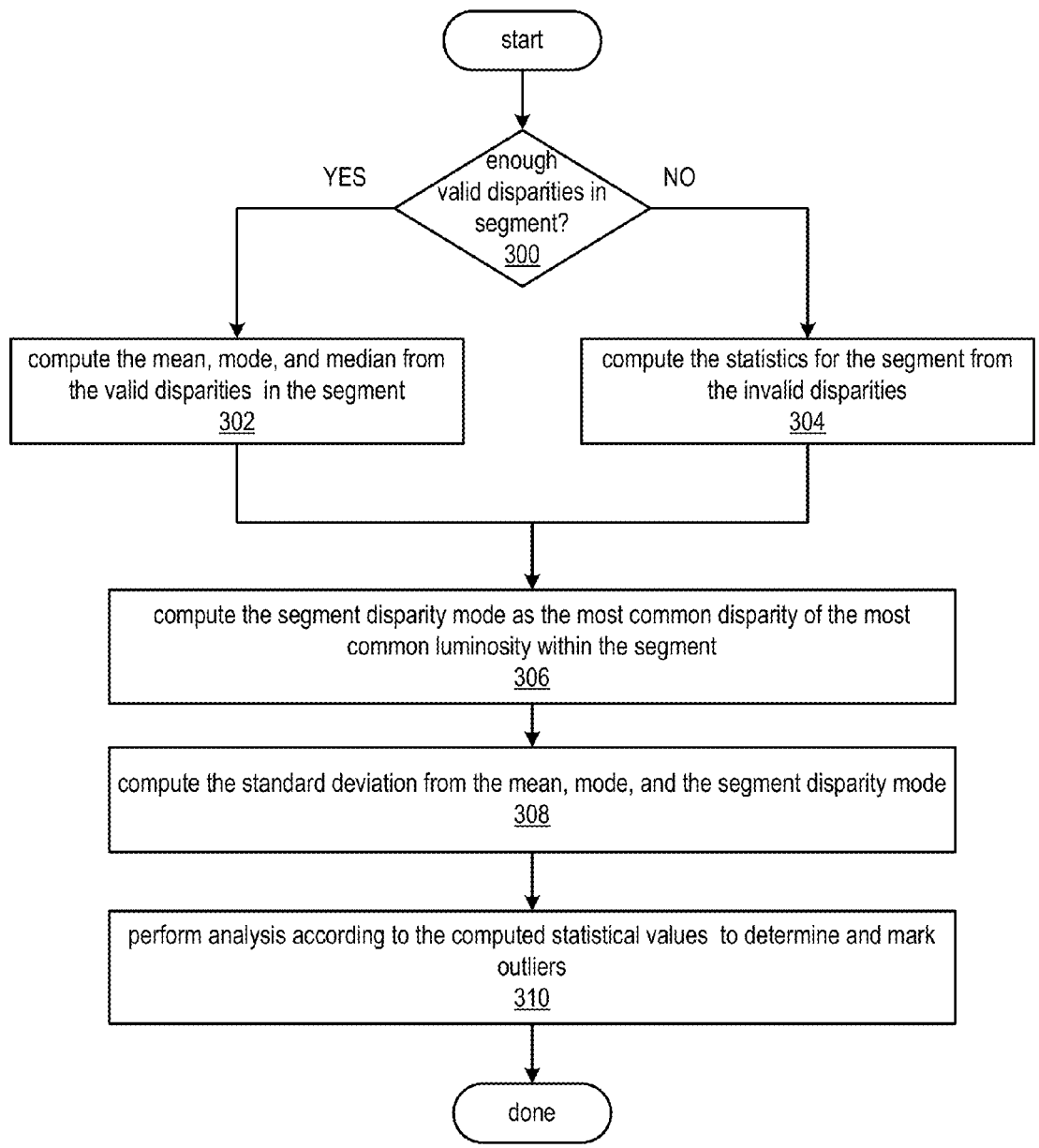
FIG. 3 is a flowchart of a method for performing a statistical analysis to identify outliers in a segment, according to at least some embodiments.

As indicated at 104 of FIG. 1, a statistical analysis of the disparities belonging to a given segment may be performed to identify those pixels that are outliers. FIG. 3 is a flowchart of an example method that may be used at element 104 for performing a statistical analysis of the disparities belonging to a given segment to identify those pixels that are outliers, according to at least some embodiments. Note that other statistical analysis methods or models may be used to determine outliers in the segments.

Referring to FIG. 3, at 300, if there are only, or a sufficient number (at least a threshold number), of valid pixels in the segment (i.e., pixels that were not determined to be invalid at element 100), the mean, mode, and median for the disparity in the segment are computed from the disparities of the valid pixels, as indicated at 302. Note that, in this case, the pixels that were previously determined to be invalid are not used in determining the mean, mode, and median of the segment. At 300, if there are no valid pixels (or fewer than the threshold number of valid pixels) in the segment, the mean, mode, and median for disparity in the segment may instead be computed from the invalid pixels, or from a combination of invalid pixels and valid pixels, as indicated at 304 since there is no or not enough valid information to evaluate.

As indicated at 306, the most common disparity of the most common luminosity within the segment may be computed (the segment disparity mode). The segment disparity mode may be referred to as segDispMode.

As indicated at 308, the method may compute the standard deviations (i.e. the square root of the average squared distance) from the mean, mode, and segment disparity mode ($\sigma_{mean}$, $\sigma_{mode}$, $\sigma_{DispMode}$).

As indicated at 310, an analysis is performed according to the computed statistical values for the segment to determine and mark outliers in the segment. An observation is that, because pixels in a segment generally have similar color (and therefore similar luminosity), then pixels of a given luminosity should have very similar disparities (since shading and depth are often related). Therefore, the most common luminosity in the segment should have roughly the same disparity, and that disparity should correspond to the mode of the entire segment. However, if this is not true, then it cannot be certain that the mode disparity is not an outlier. In practice, some segments may not contain a uniform, or bell curve, distribution of disparities. For example, the leaf trefoil in the foreground of the image of the rose shown in FIG. 4 (see, FIGS. 12A through 12E) contains a segment that has a disparity distribution with two bell shapes, one in the low disparity range, and another in the high disparity range. The mean disparity is roughly in the middle of the two curves, but the mode is at the peak of the high disparity curve. Cases such as this may present a problem in determining which pixels are likely to be outliers.

If the median lies closer to the mode than to the mean, then the majority of disparities in the segment fall near the high disparity bell curve. However, if the median is closer to the mean, then the majority of disparities in the segment fall to the left of the mode (and therefore, closer to the average). By selecting a disparity value V and a standard deviation σ for a segment according to this observation, pixels which are likely to be outliers may be determined given the distribution of disparities in the segment. Thus, in at least some embodiments, if the mode is more than a threshold distance from the segment disparity mode:

$$\|mode - segDispMode\| > \tau,$$

where τ is a tolerance value or threshold, or if the median is closer to the mean than it is to the mode:

$$\|median - mean\| < \|median - mode\|,$$

then it is probable that the mean describes the segment more accurately than the mode. In this case, then V=mean, and σ=$\sigma_{mean}$. Otherwise, it is probable that the mode describes the segment more accurately than the mean, and so V=mode, and σ=$\sigma_{mode}$.

One or more pixels in the segment may then be determined and marked as outliers according to the selected values for V and σ. In at least some embodiments, each pixel in the segment is evaluated, and a pixel is marked as an outlier if the disparity of the pixel P is more than σ from V:

$$\|V - disparity(P)\| > \sigma.$$

Figure 12A:
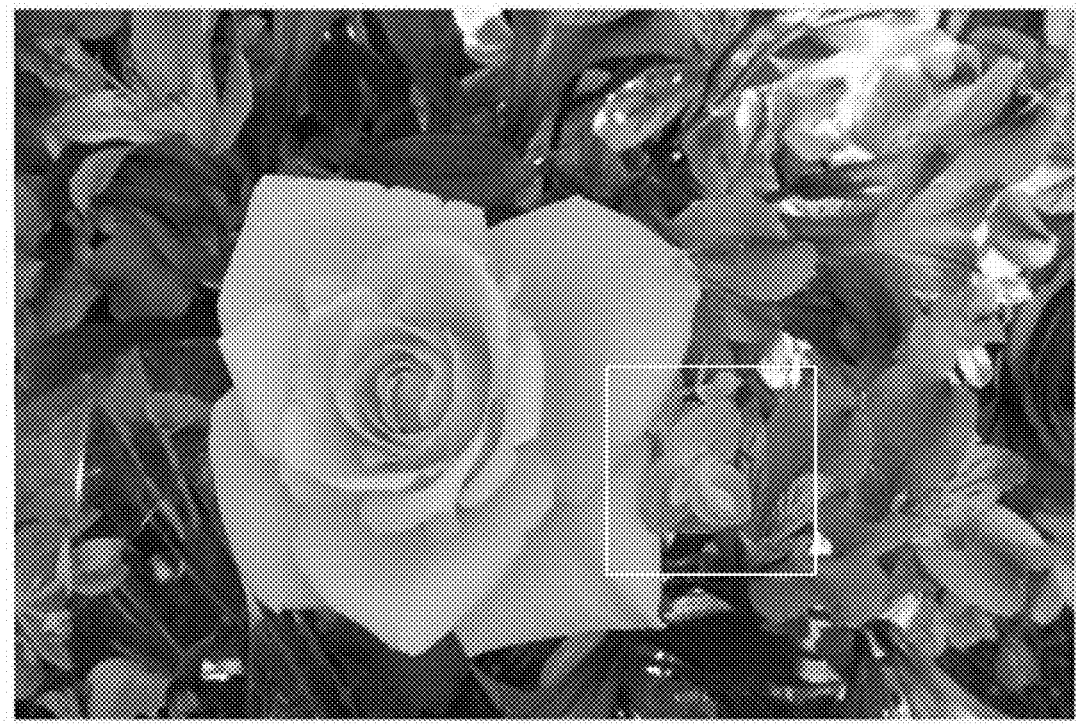
FIGS. 12A through 12E illustrate an area of an image that exhibits a double-curve (i.e. bi-modal) distribution in disparity.
Figure 12B:
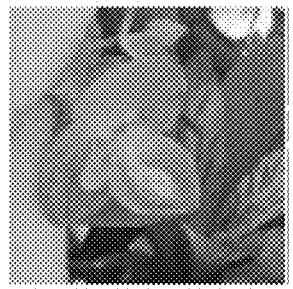
Figure 12C:
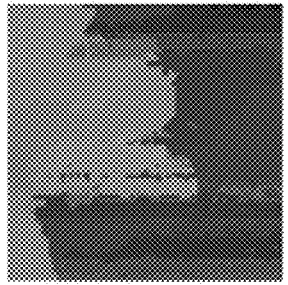
Figure 12D:
Figure 12E:

FIGS. 12A through 12E illustrate an area of the image of FIG. 4 and the original disparity map of FIG. 5 that includes a segment that exhibits a double-curve (i.e. bi-modal) distribution in disparity. FIG. 12A shows the original input image. FIG. 12B shows the area indicated by the white square in FIG. 12A that includes the leaf trefoil. FIG. 12C is the same area in the input disparity map (see FIG. 5), and shows that there are two strong disparities in the leaf trefoil. FIG. 12D shows the segment boundaries in the area for the first iteration of the disparity map correction technique. FIG. 12E is the same area in the corrected disparity map that includes the leaf trefoil after multiple iterations of the disparity map correction technique.

Referring again to FIG. 1, as indicated at 106, in each segment, the disparities at any pixels that were identified as being invalid (clearly or possibly wrong) at 100, and/or any pixels that were identified as outliers at 104, may be corrected. The invalid and outlier pixels in a segment may be corrected using any one of a variety of techniques. For example, in some embodiments, for each pixel to be corrected, N (e.g., ten) closest valid disparities within the segment may be determined, and the weighted (e.g., by distance) average of the N disparities may be computed as the new disparity value for the respective pixel. For example, if $(d_0, \ldots, d_9)$ are the disparities of the ten closest pixels to P, and $(D_0, \ldots, D_9)$ are the distances from these pixels to the target pixel P (in ascending order by distance), and:

$$\Delta = \Sigma_{i=0}^{9} D_i$$

then the weighted average (w) is:

$$w = \sum_{i=0}^{9} d_i \frac{D_{9-i}}{\Delta}$$

The weighted average (w) may be used to replace the target pixel. In at least some embodiments, for cases where there are no or not enough valid pixels to correct a pixel, the pixel may be repaired with either the segment mode or median (previously selected).

As another example, in some embodiments, a low frequency depth/disparity fill in technique may be used. For example, a technique may be used that fits a plane d(u,v)=au+bv+c using valid data, where (u,v) are coordinates of a pixel. This corrects pixel (u*,v*) by setting its disparity to au*+bv*+c. Note that other shapes than a plane may be used as a model for replacing pixels in some embodiments.

Other methods for correcting the pixels may be used in other embodiments.

At 108 of FIG. 1, elements 100 through 106 may be repeated one or more times at finer level(s) of segmentation to improve results, as necessary or desired. Repeating the technique at finer-grain segmentation(s) may help eliminate errors in smaller regions that were not caught by previous pass(es).

Figure 13:
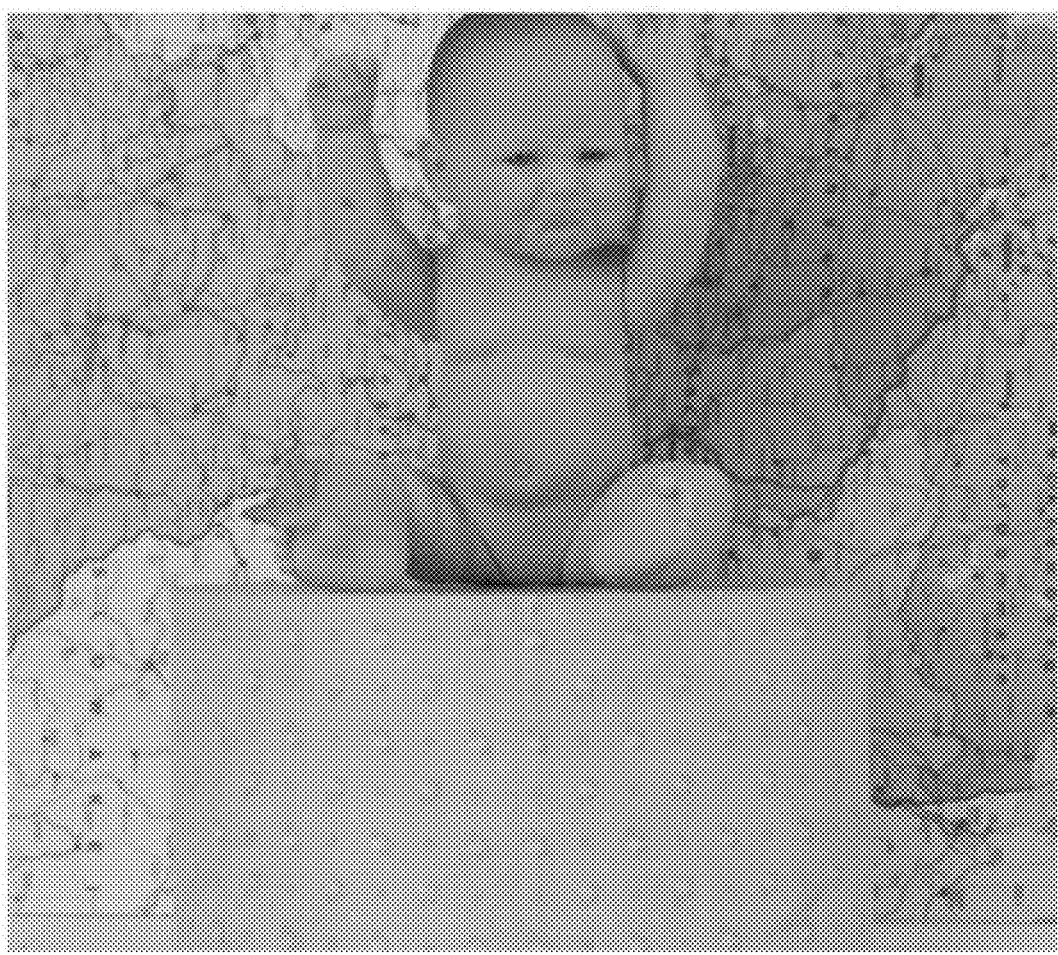
FIG. 13 shows an example original photograph or image that is input to the disparity map correction technique.
Figure 14:
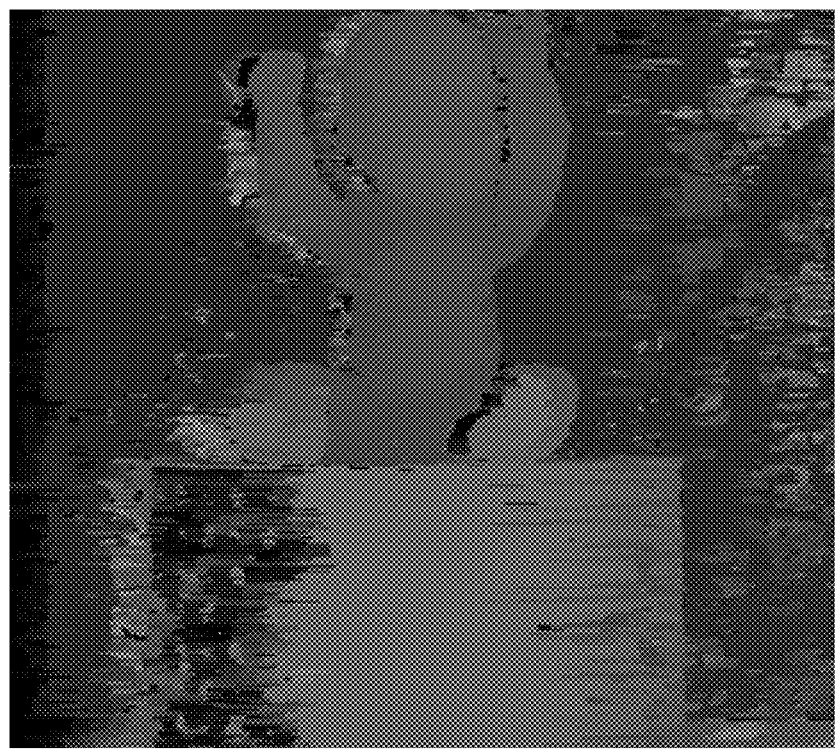
FIG. 14 shows an original disparity map computed for the image of FIG. 13 prior to applying the disparity map correction technique, according to at least some embodiments.
Figure 15A:
FIG. 15A shows the disparity map of FIG. 14 after one iteration of the disparity map correction technique, according to at least some embodiments.
Figure 15B:
FIG. 15B shows the disparity map of FIG. 14 after two iterations of the disparity map correction technique, according to at least some embodiments.
Figure 16:
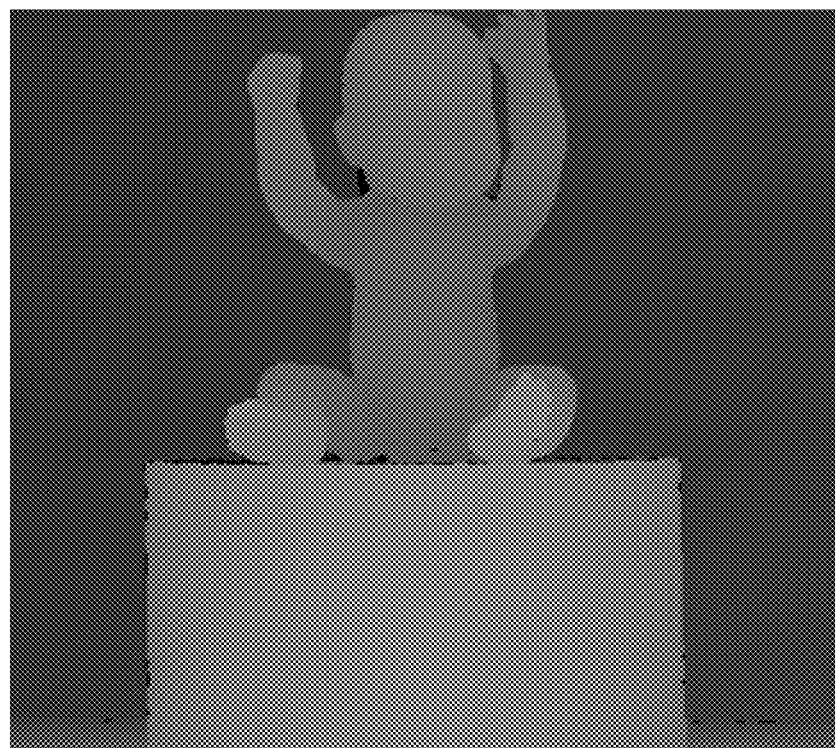
FIG. 16 shows the ground truth disparity map for the image in FIG. 12.

FIGS. 13 through 16 graphically illustrate applying an embodiment of the disparity map correction technique multiple times to a disparity map for an example image. FIG. 13 shows an example original photograph or image that is input to the disparity map correction technique. Note that the image may be one of two or more images for which a disparity map is generated for the image, for example one of a stereo image pair (either a left or right image). FIG. 14 shows an original disparity map computed for the image of FIG. 13 prior to applying the disparity map correction technique. FIG. 15A shows the disparity map of FIG. 14 after one iteration of the disparity map correction technique. Note how the flat surface of the box still contains errors. FIG. 15B shows the disparity map of FIG. 14 after two iterations of the disparity map correction technique. Note how the flat surface of the box is smoother and more consistent than the disparity map in FIG. 15A. FIG. 16 shows the ground truth disparity map for the image in FIG. 13 for comparison. Note that, after two iterations of the disparity map correction technique, the computed disparity map as shown in FIG. 15B is closer to the ground truth disparity map as shown in FIG. 16 than it was prior to applying the disparity map correction technique, as shown in FIG. 14.

Example Implementations

Some embodiments may include a means for disparity map correction. For example, a disparity map correction module may receive or obtain input identifying an input image and a disparity map for the image, identify invalid (e.g., obviously wrong) disparities in the disparity map, divide the image into local neighborhoods or segments where the distribution of disparities is predicted to be somewhat similar, perform a statistical analysis to identify additional outlier disparities at pixel in the segments, and replace the identified invalid and outlier disparities using disparity information from other pixels in the respective segment as described herein. The disparity map correction module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving or obtaining input identifying an input image and a disparity map for the image, identifying invalid pixels, dividing the image into segments where the distribution of disparities is predicted to be somewhat similar, performing a statistical analysis to identify additional outlier pixels, and replacing the identified invalid and outlier pixels using information from other pixels in the segment, as described herein. Other embodiments of the disparity map correction module or technique may be at least partially implemented by hardware circuitry and/or firmware stored, for example, in a non-volatile memory.

Figure 17:
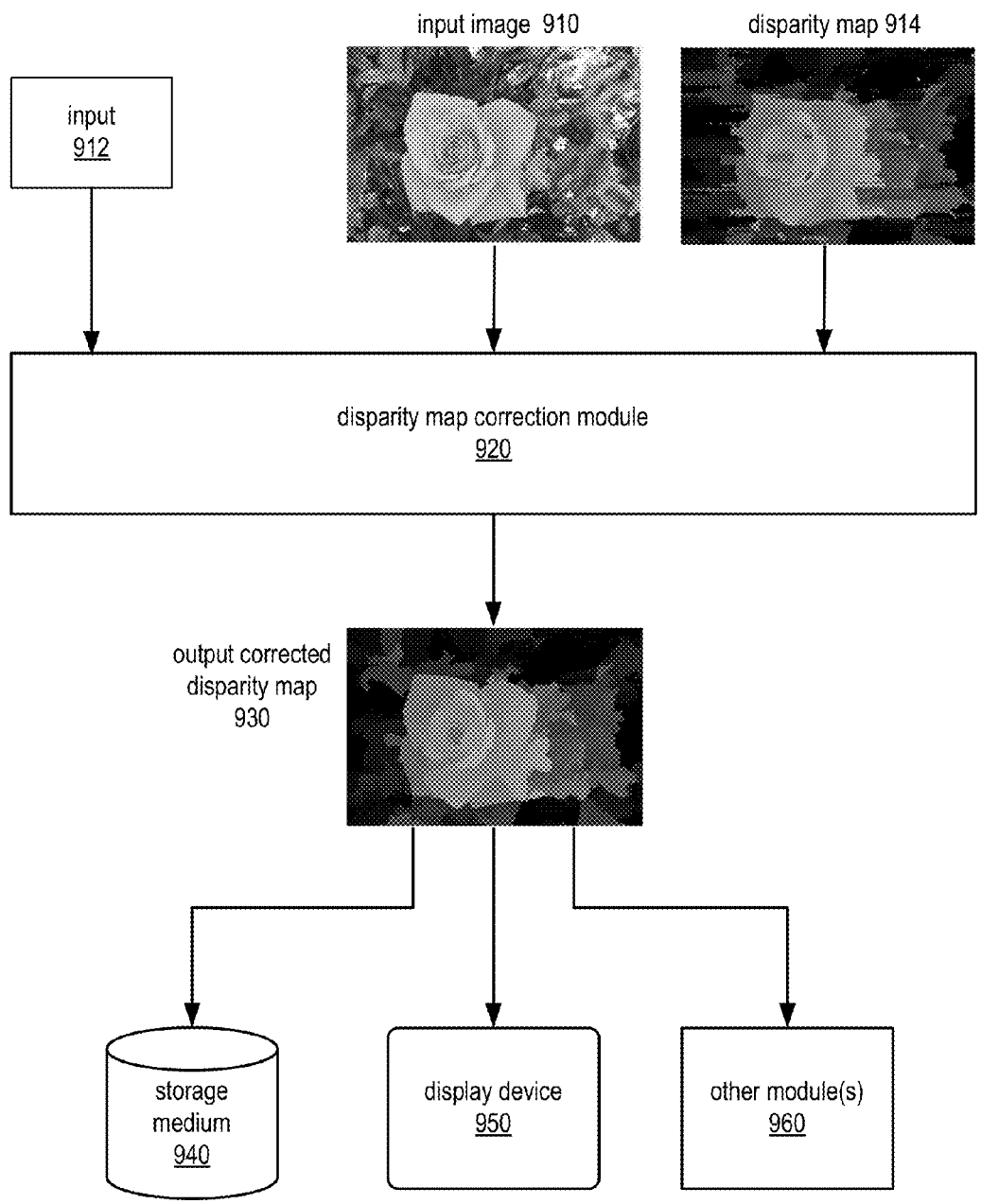
FIG. 17 illustrates a module that may implement a disparity map correction technique, according to at least some embodiments.
Figure 18:
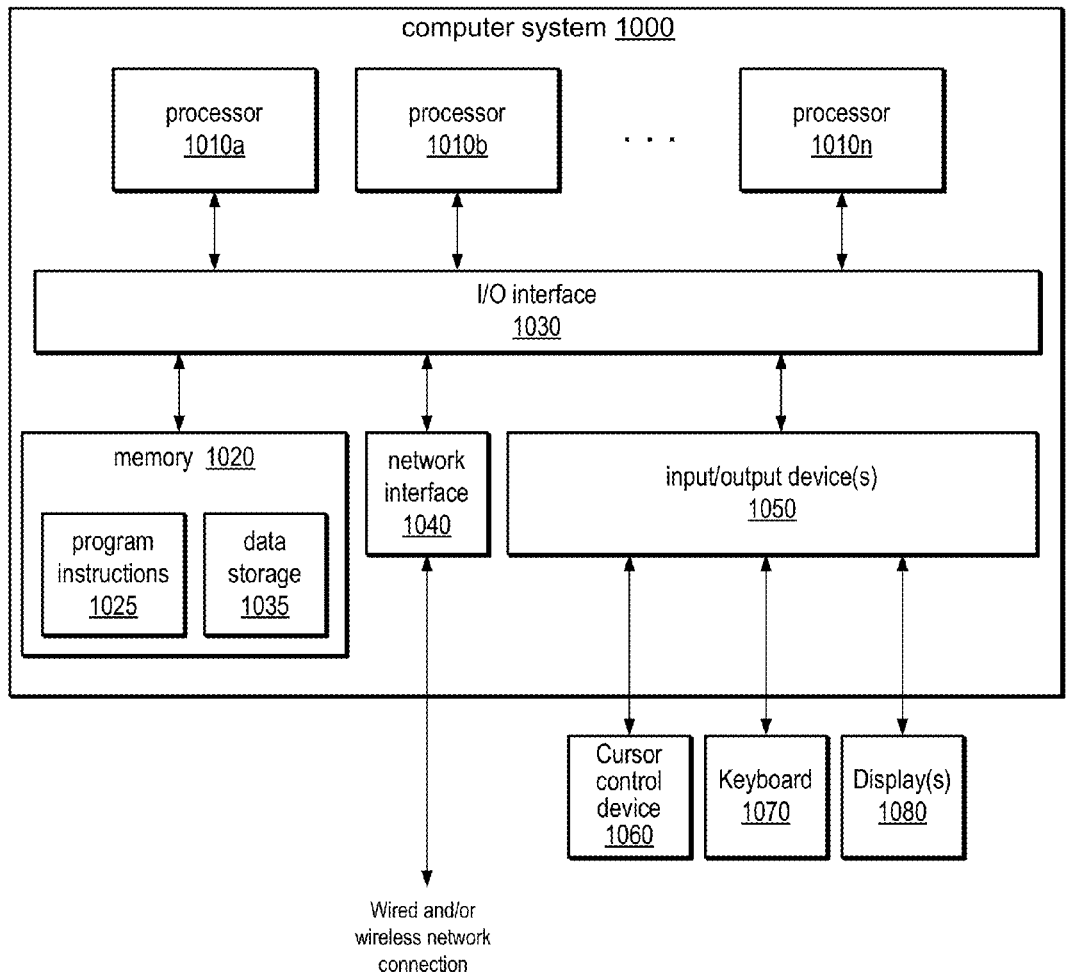
FIG. 18 illustrates an example computer system that may be used in embodiments.

Embodiments of the disparity map correction technique and/or of the various techniques described as parts of the disparity map correction technique as described herein may be implemented in software, hardware, or a combination thereof. For example, embodiments of the disparity map correction technique may be performed by a disparity map correction module implemented by program instructions stored in a computer-readable storage medium and executable by one or more processors (e.g., one or more CPUs or GPUs). Embodiments of a disparity map correction module may, for example, be implemented as a stand-alone application, as a module of an application, as a plug-in for applications including image or video processing applications, and/or as a library function or functions that may be called by other applications such as image processing or video processing applications. Embodiments of the disparity map correction module may be implemented in any image or video processing application, or more generally in any application in which images may be processed. Example applications in which embodiments may be implemented may include, but are not limited to, Adobe® Photoshop® technology applications. "Adobe" and "Photoshop" are either registered trademarks or trademarks of Adobe Systems Incorporated in the United States and/or other countries. An example disparity map correction module that may implement the disparity map correction technique as described herein is illustrated in FIG. 17. An example computer system on which a disparity map correction module may be implemented is illustrated in FIG. 18.

In addition to computer system implementations, embodiments of the disparity map correction technique and module as described herein may be implemented in other devices, for example in digital cameras or mobile devices such as smart phones and pad devices, for correcting disparity maps or depth maps, as a software module, hardware module, or a combination thereof.

FIG. 17 illustrates a disparity map correction module that may implement embodiments of the disparity map correction technique as illustrated in FIGS. 1 through 16. FIG. 18 illustrates an example computer system on which embodiments of module 920 may be implemented. Module 920 may receive as input at least one image 910 and a corresponding at least one original disparity map 914 for the image 910. An example input image is shown in FIG. 4, and an example original disparity map is shown in FIG. 5. Module 920 may then identify obviously or possibly wrong pixels and mark them as invalid, divide the image into local neighborhoods or segments where the distribution of disparities is predicted to be somewhat similar, perform a statistical analysis on each segment to identify outlier pixels in each segment, and replace the identified invalid or outlier pixels in each segment using information from other pixels in the segment as described herein. This process may be repeated one or more times at smaller segmentations to improve results. Module 920 may generate a corrected disparity map 930 as output. An example corrected disparity map is shown in FIG. 8. Corrected disparity map 930 may, for example, be stored to a storage medium 940, such as system memory, a disk drive, DVD, CD, etc., displayed on a display device 950, and/or passed to one or more other modules 960 for additional processing.

In at least some embodiments, disparity map correction module 920 may provide one or more interfaces via which another entity (e.g., a user or another module) may interact with the module 920, for example to specify one or more parameters of or inputs to the disparity map correction technique as described herein.

Example System

Embodiments of a disparity map correction technique or module as described herein may be executed on one or more computer systems, which may interact with various other devices. One such computer system is illustrated by FIG. 18. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a disparity map correction technique or module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 18, memory 1020 may include program instructions 1025, configured to implement embodiments of a disparity map correction technique or module as described herein, and data storage 1035, comprising various data accessible by program instructions 1025. In one embodiment, program instructions 1025 may include software elements of embodiments of a disparity map correction technique or module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a disparity map correction technique or module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
performing, by one or more computer devices:
identifying one or more invalid disparities in a disparity map of an image, wherein the disparity map indicates a disparity for each pixel in the image, wherein each disparity indicates an offset from a corresponding pixel in the image to a pixel in another image;
segmenting the image into a plurality of segments according to pixel values in the image, where each segment includes pixels in the image with substantially similar values;
identifying one or more outlier disparities in the disparity map according to a statistical analysis technique applied to each of a plurality of regions of the disparity map, wherein the plurality of regions correspond to the plurality of segments; and
correcting the identified one or more outlier disparities and the identified one or more invalid disparities according to valid disparities in the disparity map to generate a corrected disparity map for the image.

2. The method as recited in claim 1, where the one or more invalid disparities include one or more of:

disparities at which difference in pixel value between the respective pixel in the image and the pixel in the other image indicated by the offset is above a specified threshold;

disparities at which an occlusion error is indicated according to a disparity map of the other image; or disparities at which the offset indicates a location that is outside the other image.

3. The method as recited in claim 1, wherein said identifying one or more outlier disparities in the disparity map according to a statistical analysis technique applied to each of a plurality of regions of the disparity map comprises, for each region:

computing one or more statistical values for disparity in the region; and performing the statistical analysis in the region according to at least one of the one or more computed statistical values for disparity in the region to detect outlier disparities in the respective region.

4. The method as recited in claim 3, wherein said computing one or more statistical values for disparity in the region comprises:

if there are at least a threshold number of valid disparities within the region, computing the one or more statistical values according to the valid disparities within the region; and if there are less than the threshold number of valid disparities within the region, computing the one or more statistical values according to invalid disparities within the region.

5. The method as recited in claim 3, wherein said computing one or more statistical values for disparity in the region comprises:

computing mean, median, and mode for disparities in the region;

computing a segment disparity mode for the region, wherein the segment disparity mode is the most common disparity of the most common luminosity in the respective segment of the image; and computing standard deviations for the mean, the mode, and the segment disparity mode in the region.

6. The method as recited in claim 5, wherein said performing the statistical analysis in the region according to at least one of the one or more computed statistical values for disparity in the region to detect outlier disparities in the respective region comprises:

determining whether the mean or the mode describes distribution of the disparities in the region more accurately;

if the mean describes the distribution of the disparities in the region more accurately, performing the statistical analysis in the region according to the mean and the standard deviation of the mean;

if the mode describes the distribution of the disparities in the region more accurately, performing the statistical analysis in the region according to the mode and the standard deviation of the mode.

7. The method as recited in claim 6, wherein the mean is determined to describe the distribution of the disparities in the region more accurately if the mode minus the segment disparity mode is greater than a specified threshold or if the median is closer to the mean than it is to the mode.

8. The method as recited in claim 1, further comprising iteratively performing said identifying invalid disparities, said segmenting, said identifying outlier disparities, and said correcting, wherein, at each iteration, a threshold for said segmenting is changed to generate smaller segments than at a previous iteration.

9. The method as recited in claim 1, wherein said correcting the identified one or more outlier disparities and the identified one or more invalid disparities according to valid disparities in the disparity map comprises, for each of the one or more outlier disparities and each of the one or more invalid disparities, replacing the respective disparity according to a weighted average of two or more valid disparities within a respective region.

10. The method as recited in claim 1, wherein said correcting the identified one or more outlier disparities and the identified one or more invalid disparities according to valid disparities in the disparity map comprises, for each of the one or more outlier disparities and each of the one or more invalid disparities, replacing the respective disparity according to a model fitted to valid disparities within a respective region.

11. A system, comprising:

one or more processors; and a memory comprising program instructions, wherein the program instructions are executable by at least one of the one or more processors to:

identify one or more invalid disparities in a disparity map of an image, wherein the disparity map indicates a disparity for each pixel in the image, wherein each disparity indicates an offset from a corresponding pixel in the image to a pixel in another image;

perform segmentation of the image to generate a plurality of segments according to pixel values in the image, where each segment includes pixels in the image with substantially similar values;

identify one or more outlier disparities in the disparity map according to a statistical analysis technique applied to each of a plurality of regions of the disparity map, wherein the plurality of regions correspond to the plurality of segments; and correct the identified one or more outlier disparities and the identified one or more invalid disparities according to valid disparities in the disparity map to generate a corrected disparity map for the image.

12. The system as recited in claim 11, where the one or more invalid disparities include one or more of:

disparities at which difference in pixel value between the respective pixel in the image and the pixel in the other image indicated by the offset is above a specified threshold;

disparities at which an occlusion error is indicated according to a disparity map of the other image; or disparities at which the offset indicates a location that is outside the other image.

13. The system as recited in claim 11, wherein, to identify one or more outlier disparities in the disparity map according to a statistical analysis technique applied to each of a plurality of regions of the disparity map, the program instructions are executable by at least one of the one or more processors to, for each region:

compute mean and mode for disparities in the region;

determine whether the mean or the mode describes distribution of the disparities in the region more accurately;

if the mean describes the distribution of the disparities in the region more accurately, perform the statistical analysis in the region according to the mean and standard deviation of the mean;

if the mode describes the distribution of the disparities in the region more accurately, perform the statistical analysis in the region according to the mode and standard deviation of the mode.

14. The system as recited in claim 11, wherein the program instructions are executable by at least one of the one or more processors to iteratively perform said identify invalid disparities, said segmentation, said identify outlier disparities, and said correct, wherein, at each iteration, the program instructions are executable by at least one of the one or more processors to change a threshold for said segmentation to generate smaller segments than at a previous iteration.

15. The system as recited in claim 11, wherein, to correct the identified one or more outlier disparities and the identified one or more invalid disparities according to valid disparities in the disparity map, the program instructions are executable by at least one of the one or more processors to, for each of the one or more outlier disparities and each of the one or more invalid disparities, replace the respective disparity according to two or more valid disparities within a respective region.

16. A non-transitory computer-readable storage medium storing program instructions, wherein the program instructions are computer-executable to implement:
   identifying one or more invalid disparities in a disparity map of an image, wherein the disparity map indicates a disparity for each pixel in the image, wherein each disparity indicates an offset from a corresponding pixel in the image to a pixel in another image;
   segmenting the image into a plurality of segments according to pixel values in the image, where each segment includes pixels in the image with substantially similar values;
   identifying one or more outlier disparities in the disparity map according to a statistical analysis technique applied to each of a plurality of regions of the disparity map, wherein the plurality of regions correspond to the plurality of segments; and
   correcting the identified one or more outlier disparities and the identified one or more invalid disparities according to valid disparities in the disparity map to generate a corrected disparity map for the image.

17. The non-transitory computer-readable storage medium as recited in claim 16, where the one or more invalid disparities include one or more of:
   disparities at which difference in pixel value between the respective pixel in the image and the pixel in the other image indicated by the offset is above a specified threshold;
   disparities at which an occlusion error is indicated according to a disparity map of the other image; or
   disparities at which the offset indicates a location that is outside the other image.

18. The non-transitory computer-readable storage medium as recited in claim 16, wherein, in said identifying one or more outlier disparities in the disparity map according to a statistical analysis technique applied to each of a plurality of regions of the disparity map, wherein the plurality of regions correspond to the plurality of segments, the program instructions are computer-executable to implement, for each region:
   computing mean and mode for disparities in the region;
   determining whether the mean or the mode describes distribution of the disparities in the region more accurately;
   if the mean describes the distribution of the disparities in the region more accurately, performing the statistical analysis in the region according to the mean and standard deviation of the mean;
   if the mode describes the distribution of the disparities in the region more accurately, performing the statistical analysis in the region according to the mode and standard deviation of the mode.

19. The non-transitory computer-readable storage medium as recited in claim 16, wherein the program instructions are computer-executable to implement iteratively performing said identifying invalid disparities, said segmenting, said identifying outlier disparities, and said correcting, wherein, at each iteration, a threshold for said segmenting is changed to generate smaller segments than at a previous iteration.

20. The non-transitory computer-readable storage medium as recited in claim 16, wherein, in said correcting the identified one or more outlier disparities and the identified one or more invalid disparities according to valid disparities in the disparity map, the program instructions are computer-executable to implement, for each of the one or more outlier disparities and each of the one or more invalid disparities, replacing the respective disparity according to two or more valid disparities within a respective region.

* * * * *